United States Patent
Presson

(10) Patent No.: US 11,273,885 B2
(45) Date of Patent: Mar. 15, 2022

(54) HIGH-RISE BICYCLE STEM

(71) Applicant: Lane B. Presson, Jackson, WY (US)

(72) Inventor: Lane B. Presson, Jackson, WY (US)

(73) Assignee: Lane B Presson, Jackson, WY (US)

( * ) Notice: Subject to any disclaimer, the term of this patent is extended or adjusted under 35 U.S.C. 154(b) by 0 days.

(21) Appl. No.: 17/230,721

(22) Filed: Apr. 14, 2021

(65) Prior Publication Data

US 2022/0017177 A1    Jan. 20, 2022

Related U.S. Application Data

(60) Provisional application No. 63/052,852, filed on Jul. 16, 2020.

(51) Int. Cl.
*B62K 21/16* (2006.01)

(52) U.S. Cl.
CPC .................... *B62K 21/16* (2013.01)

(58) Field of Classification Search
CPC ........ B62K 21/18; B62K 21/22; B62K 21/24; B62K 21/12; B62K 21/16
See application file for complete search history.

(56) References Cited

U.S. PATENT DOCUMENTS

| | | | | |
|---|---|---|---|---|
| 3,136,149 A | * | 6/1964 | Klein, Jr. ................ | B62H 5/06 70/187 |
| 3,945,667 A | * | 3/1976 | Cipres .................... | B62K 3/02 280/7.15 |
| 4,043,688 A | | 8/1977 | Humlong | |
| D285,295 S | | 8/1986 | Kirkpatrick | |
| 4,916,970 A | | 4/1990 | McCurtey | |
| 5,193,930 A | * | 3/1993 | Chi ........................ | B62K 21/12 403/24 |
| 5,213,006 A | | 5/1993 | Liao | |
| D341,801 S | | 11/1993 | McCormack et al. | |
| 5,299,467 A | * | 4/1994 | Marui ...................... | B62J 1/08 280/279 |

(Continued)

FOREIGN PATENT DOCUMENTS

| | | |
|---|---|---|
| CN | 2091266 U | 12/1991 |
| CN | 2175172 Y | 8/1994 |

(Continued)

OTHER PUBLICATIONS

"Stem (bicycle part)," Wikipedia Page, dated by Wayback Machine to Nov. 17, 2016, url:<https://web.archive.org/web/20161117145745/https://en.wikipedia.org/wiki/Stem_(bicycle_part)#Stem_construction>.*

*Primary Examiner* — Richard W Ridley
*Assistant Examiner* — Brian J McGovern
(74) *Attorney, Agent, or Firm* — Daniel Sherwinter; Kilpatrick Townsend and Stockton LLP

(57) ABSTRACT

Systems and methods are described for providing a high-rise ahead-type handlebar stem for a bicycle. Embodiments of the high-rise ahead stem include a main stem tube and a handlebar stem tube. The main stem tube includes a proximal region non-overlapping with a distal region. The proximal region includes a rotational securement structure. The handlebar stem tube extends from the distal region and terminates in a handlebar interface structure. The high-rise ahead stem provides various features, including relatively simple adjustment of handlebar height over a relatively large range of heights, while maintaining a high level of strength.

19 Claims, 12 Drawing Sheets

(56) References Cited

U.S. PATENT DOCUMENTS

| | | | |
|---|---|---|---|
| D354,259 S | 1/1995 | Kurke et al. | |
| 5,426,996 A * | 6/1995 | Chang | F16B 2/08 |
| | | | 74/551.1 |
| 5,476,020 A | 12/1995 | Garvey et al. | |
| 5,536,104 A * | 7/1996 | Chen | B62K 21/18 |
| | | | 280/279 |
| 6,167,780 B1 * | 1/2001 | Chen | B62K 21/06 |
| | | | 74/551.1 |
| 6,186,027 B1 * | 2/2001 | Nielsen | B62K 21/18 |
| | | | 403/365 |
| D451,847 S | 12/2001 | Donikoglu | |
| 6,394,692 B1 * | 5/2002 | Lin | B62K 21/06 |
| | | | 280/279 |
| 6,557,878 B2 * | 5/2003 | Chen | B62J 1/08 |
| | | | 280/226.1 |
| 7,055,394 B2 | 6/2006 | Kinoshita | |
| 8,181,980 B1 | 5/2012 | Moore | |
| 8,307,735 B2 | 11/2012 | Wehage | |
| 8,555,609 B1 | 10/2013 | Chamberlain et al. | |
| 10,421,521 B2 | 9/2019 | Bierwerth et al. | |
| 10,442,492 B2 | 10/2019 | Taylor | |
| 2003/0110880 A1 * | 6/2003 | Tison | B62K 21/06 |
| | | | 74/551.8 |
| 2006/0130605 A1 * | 6/2006 | Chen | B62K 21/12 |
| | | | 74/551.1 |
| 2006/0162482 A1 | 7/2006 | Okajima et al. | |
| 2007/0241531 A1 | 10/2007 | D'Aluisio et al. | |
| 2013/0101345 A1 * | 4/2013 | Wang | B62K 21/12 |
| | | | 403/385 |
| 2015/0225035 A1 | 8/2015 | Li | |
| 2019/0023348 A1 * | 1/2019 | Taylor | B62K 21/22 |
| 2019/0233043 A1 | 8/2019 | Huang et al. | |
| 2019/0367122 A1 | 12/2019 | Vandermolen et al. | |
| 2020/0222753 A1 * | 7/2020 | Schranz | A63B 21/023 |

FOREIGN PATENT DOCUMENTS

| | | |
|---|---|---|
| CN | 2652796 Y | 11/2004 |
| CN | 200992283 Y | 12/2007 |
| CN | 201405992 Y | 2/2010 |
| CN | 201447029 U | 5/2010 |
| CN | 210000482 U | 1/2020 |
| DE | 202018104595 U1 | 11/2018 |
| JP | 0667281 U | 9/1994 |

* cited by examiner

HIGH-RISE BICYCLE STEM

CROSS-REFERENCES TO RELATED APPLICATIONS

This application claims the benefit of priority to U.S. Provisional Patent Application No. 63/052,852 filed Jul. 16, 2020, entitled "HIGH-RISE BICYCLE STEM," the content of which is herein incorporated in its entirety.

FIELD

Embodiments relate generally to bicycle structures, and, more particularly, to high-rise bicycle stems to provide an interface between the bicycle's handlebars and steerer tube.

BACKGROUND

There are many different types, shapes, sizes, and styles of bicycles. Still, they all tend to have many of the same types of components, such as a frame, a front wheel, a back wheel, a seat, handlebars, and drive components (e.g., pedals, a chain, gears, derailleurs, brakes, etc.). Typically, the fit of a bicycle to a rider can depend on a number of factors, such as the type and size of the frame, distance between the seat and the pedals, distance from the seat to the handlebars, and height of the handlebars. Generally, a rider selects one of a set of available fixed frame sizes, each designed to accommodate a respective range of rider sizes, then adjusts the seat to an appropriate height by raising or lowering the seat on its seat post. However, adjustments to handlebar position tend to be difficult, expensive, relatively minor, and/or otherwise insufficient to maximize fit for particular riders, particularly if a rider desires different fits for different riding conditions, or the like.

BRIEF SUMMARY

Among other things, systems and methods are described for providing a high-rise ahead-type handlebar stem for a bicycle. Embodiments of the high-rise ahead stem include a main stem tube and a handlebar stem tube. The main stem tube includes a proximal region non-overlapping with a distal region. The proximal region includes a rotational securement structure. The handlebar stem tube extends from the distal region and terminates in a handlebar interface structure. The high-rise ahead stem provides various features, including relatively simple adjustment of handlebar height over a relatively large range of heights, while maintaining a high level of strength.

According to one set of embodiments, a high-rise ahead stem is provided. The high-rise ahead stem includes: a main stem tube configured to sheathe a steerer tube, the main stem tube comprising: a proximal region extending from a substantially flat proximal end configured to be compressed against a headset assembly of a bicycle in an upright installation, the proximal region having a rotational securement structure configured to rotationally secure the main stem tube to the steerer tube; and a distal region extending from the proximal region to a distal end; and a handlebar stem tube coupled, at a first end, with the distal region of the main stem tube and comprising, at a second end, a handlebar interface structure to secure a handlebar to the handlebar stem tube.

According to another set of embodiments, a kit is provided for installing a high-rise ahead stem. The kit includes: the high-rise ahead stem; installation instructions; and a cap bolt and/or a non-integrated clamping structure.

According to another set of embodiments, a method is provided for installing a high-rise ahead stem on a bicycle, the bicycle having a front steering assembly comprising a steerer tube, a headset assembly, and handlebars, the high-rise ahead stem, the high-rise ahead stem having a proximal region non-overlapping with a distal region. The method includes: sheathing the steerer tube with a main stem tube of the high-rise ahead stem by inserting the steerer tube into the main stem tube via a first end of the main stem tube; coupling a stem cap with a second end of the main stem tube opposite the first end of the main stem tube; securing the main stem tube axially to the steerer tube by threading a cap bolt via the stem cap into a nut installed in the steerer tube and tightening the cap bolt, thereby compressing the first end of the main stem tube to the headset assembly via at least the stem cap and the high-rise ahead stem; securing the main stem tube rotationally to the steerer tube by tightening a rotational securement structure in the proximal region of the main stem tube around the steerer tube; and coupling the handlebars to a handlebar stem tube coupled with and extending from the distal region of the main stem tube.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
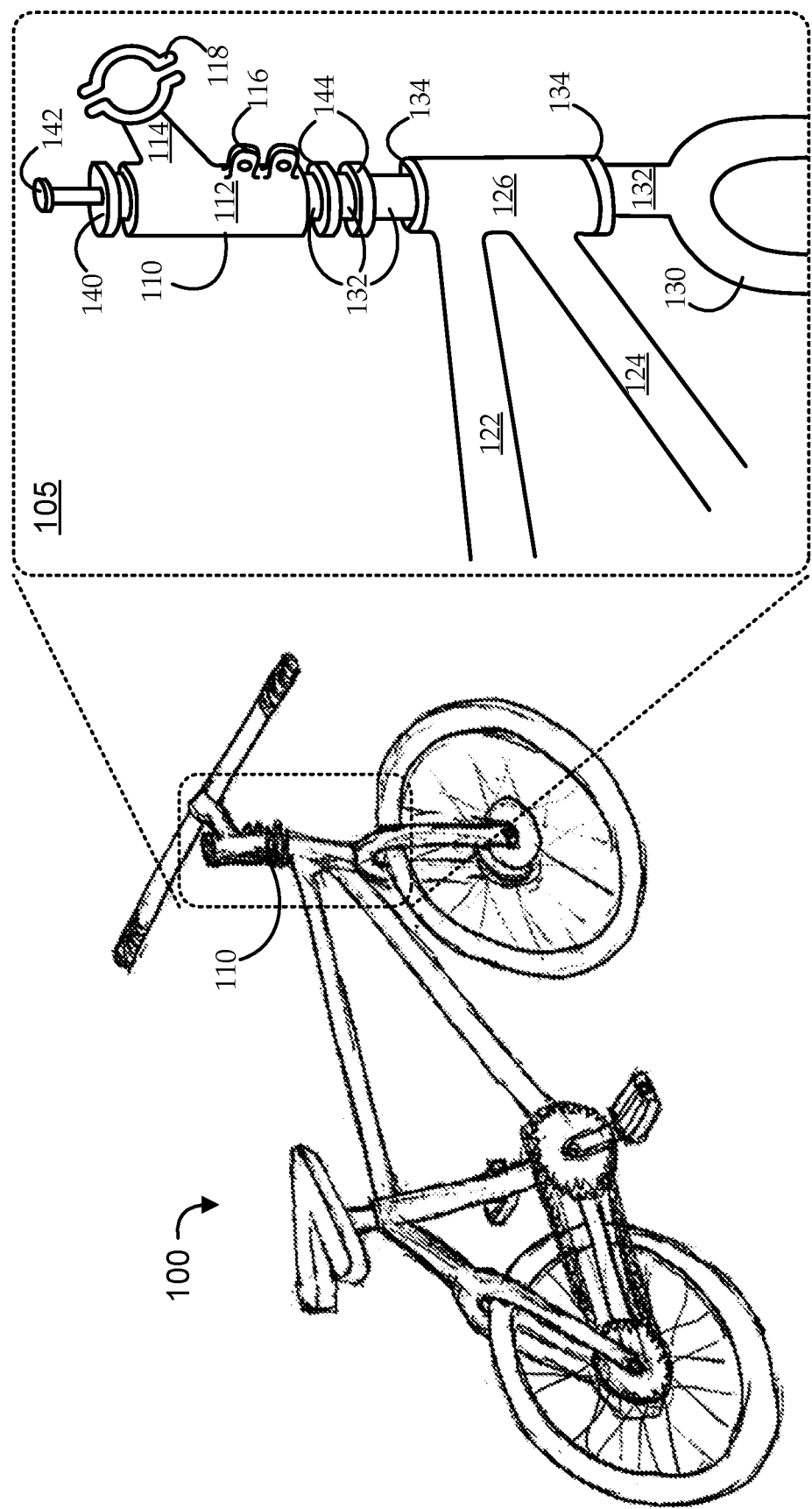
FIG. 1 shows a bicycle and components of a front steering environment, as a context for various embodiments.

FIG. 1 shows a bicycle 100 and components of a front steering portion 105, as a context for various embodiments. The illustrated bicycle 100 shows a simplified view of various standard bicycle components, including a frame, front and rear wheels, a seat mounted on a seat post, and drive components (e.g., pedals, a chain, gears, etc.). Though not explicitly shown, many other standard and optional components are also typically found on bicycles, such as brakes, gear shifters, derailleurs, reflectors, lights, suspension components, etc. The bicycle 100 is also shown with handlebars coupled via an illustrative high-rise ahead stem 110. As described herein, the illustrated high-rise ahead stem 110 is a novel type of ahead-type handlebar stem that provides various features relative to conventional high-rise ahead stems, such as enabling relatively simple adjustment of handlebar height over a relatively large range of heights, while also providing increased strength and/or comfort over many conventional designs.

Embodiments of the high-rise ahead stem 110 are configured to install in a front steering portion 105 of the bicycle 100. As illustrated, the front steering portion 105 can include a front portion of the bicycle frame made up of the frame top tube 122, the frame bottom tube 124, and the frame head tube 126. The front wheel attaches to the bicycle 100 via a front fork 130 having a steerer tube 132. The steerer tube 132 sits within the frame head tube 126 and is permitted to rotate within the frame head tube 126, thereby permitting the front fork 130 (and, thereby, the front wheel) to turn by turning the steerer tube 132. Handlebars can be coupled with the steerer tube 132, so that the handlebars can be used to turn (steer) the steerer tube 132. This coupling is via a handlebar stem. A headset assembly 134 holds the steerer tube 132 in the frame head tube 126, while still permitting the steerer tube 132 to turn. For example, components installed on the steerer tube 132 are used to apply and maintain pressure on the headset assembly 134 to secure the steerer tube 132 in its place, and the headset assembly 134 includes headset parts (e.g., bearing cartridges, head tube caps, etc.) to permit the steerer tube 132 to turn while secured by the pressurized headset assembly 134.

In the illustrated configuration, the novel high-rise ahead stem 110 is shown in an exploded view (i.e., not fully installed). The high-rise ahead stem 110 can include a main stem tube 112 and a handlebar stem tube 114. The main stem tube 112 and the handlebar stem tube 114 can be manufactured separately and coupled together (e.g., by welding, or any other suitable process), or they may be manufactured partially or completely as a unitary structure. The main stem tube 112 can couple with the steerer tube 132 via a rotational securement structure 116, and the handlebar stem tube 114 can couple with handlebars via a handlebar interface structure 118. The particular illustrated configuration shows the high-rise ahead stem 110 stacked on top of multiple spacers 144. The high-rise ahead stem 110 is secured into place by a stem cap 140 with a cap bolt 142. Tightening the cap bolt 142 also pre-loads the bearings and other parts of the headset assembly 134 by applying pressure from the stem cap 140 onto the headset assembly 134 via the high-rise ahead stem 110 and spacers 144. As described herein, different configurations are possible, including using no spacers 144, using different numbers of spacers 144 above and/or below the high-rise ahead stem 110, inverting the high-rise ahead stem 110, etc.

Features of the high-rise ahead stem 110 can be further appreciated in comparison to conventional handlebar stems. There is a large variety of handlebar stem types, but the different types tend mostly to fall into two categories: so-called "quill" stems, and so-called "ahead" (or "threadless") stems. Notably, the term "threadless" can be misleading in this context. As used with regard to stems, the term refers to the steerer tube, not the stem; and adaptors are available to allow threadless stems to fit onto threaded steerer tubes. As such, the term "ahead" stem is used herein for added clarity. Quill stems have been around longer than ahead stems and have largely been replaced by ahead stems in most modern bicycle designs. A primary difference is that quill stems tend to be inserted into the steerer tube, while ahead stems tend to clamp around the outside of the steerer tube.

Figure 3:
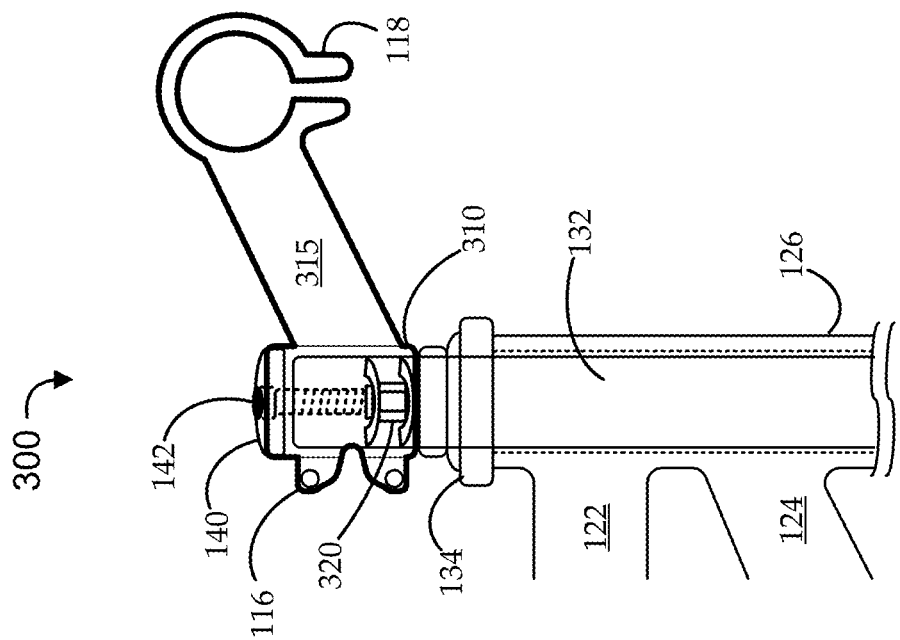
FIGS. 2 and 3 show examples of conventional quill and ahead stems, respectively.
Figure 2:
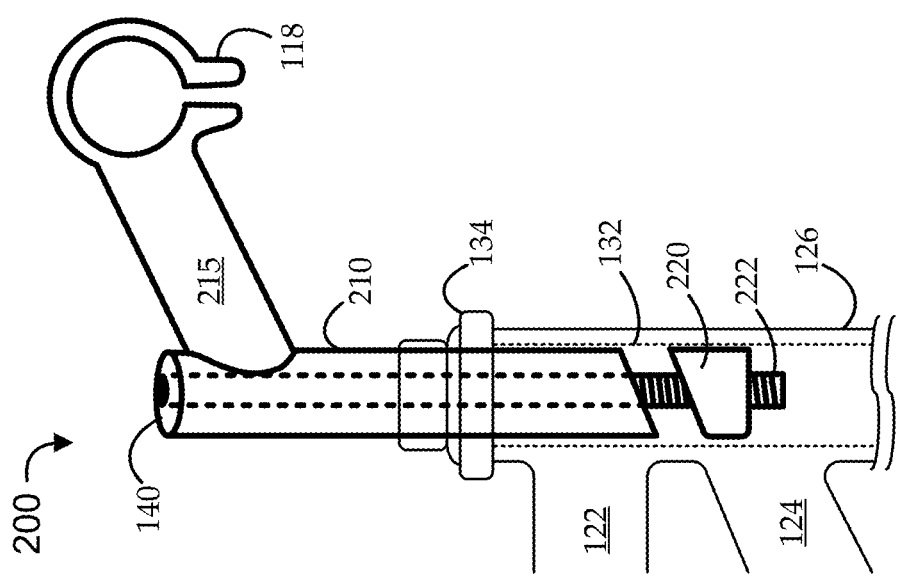

For added clarity, FIGS. 2 and 3 show examples of conventional quill stems and ahead stems, respectively. Turning first to FIG. 2, a conventional quill stem setup 200 is shown, with a quill stem shown in context of a partial front portion of an illustrative bicycle frame (including a frame top tube 122, frame bottom tube 124, and frame head tube 126). The quill stem generally includes a main quill tube 210 and a handlebar quill tube 215. In a quill stem setup 200, the steerer tube 132 is threaded and may not extend past the headset assembly 134. For example, the steerer tube 132 is sized to fit a particular frame head tube 126 size and is installed with the headset assembly 134 in the frame head tube 126 in a manner that sets and maintains headset pressure on bearings and other components, regardless of whether the quill stem is also installed. The quill stem can then be installed into the steerer tube 132 by inserting the main quill tube 210 into the hollow steerer tube 132, and securing it in place with an expanding wedge-shaped or cone-shaped nut 220 and bolt 222. For example, tightening the bolt 222 internal to the quill stem pulls on the illustrated wedge-shaped nut 220, forcing the nut 220 against the inner wall of the steerer tube 132, and securing the main quill tube 210 both vertically and rotationally.

Such a configuration provides various features. One feature is that quill stems tend to provide simple fine adjustment of the stem height within the steerer tube 132 to effectively set the height of the handlebars. Another feature is that the quill stem can be completely removed without removing the pressure on the headset assembly 134. However, quill stems also have various limitations. For example, it can be difficult to tighten a quill stem enough to prevent any rotation within in the steerer tube 132, particularly as inserting the quill stem into the steerer tube 132 often involves grease. As such, handlebars attached via quill stem can be more easily knocked out of position or alignment during a ride.

Turning to FIG. 3, a conventional ahead (or "threadless") stem setup 300 is shown, with an ahead stem shown in context of a front portion of an illustrative bicycle frame (including a frame top tube 122, frame bottom tube 124, and frame head tube 126). The ahead stem generally includes a main ahead tube 310 handlebar ahead tube 315. In an ahead stem setup 300, the steerer tube 132 is typically unthreaded and extends well past the headset assembly 134. The steerer tube 132 essentially floats within the frame head tube 126, and a stack of components, which may include the ahead stem, provides headset pressure. As illustrated, a tool is used to drive a special, barbed star nut 320 into the steerer tube 132. In some cases (e.g., in context of carbon fiber steerer tubes), expansion plugs, or other components are used instead of the star nut 320 to realize the same effect without damaging the inner material of the steerer tube 132. A cap bolt 142 is then screwed through a so-called stem cap 140 and into the star nut 320 driven into the steerer tube 132. In some implementations, the cap bolt 142 is screwed through an integrated opening in the stem, through a spacer cap, and/or through another "top" component, and the stem cap 140 is then screwed or snapped over the top of that, such as for aesthetics (e.g., to hide the top of the cap bolt 142). For the sake of simplicity, references to "stem caps" herein are intended generally to include any such "top" components. A stack of components between the stem cap 140 and the headset assembly 134 effectively transfers compressive force from the stem cap 140 onto the headset assembly 134 when the stem cap 140 is screwed tightly in to place, thereby applying and maintaining headset pressure (pre-loading bearing cartridges in the headset assembly 134).

In ahead stems, the main ahead tube 310 clamps around the steerer tube 132, rather than being inserted into the steerer tube 132. For example, one or more rotational securement structures 116 can be used to constrict the main ahead tube 310 around the steerer tube 132. In conventional ahead stems, the one or more rotational securement structures 116 are typically located at a similar vertical position to where the handlebar ahead tube 315 meets the main ahead tube 310. In some such conventional implementations, the rotational securement structures 116 are directly opposite (e.g., 180 degrees around the main ahead tube 310) from where the handlebar ahead tube 315 meets the main ahead tube 310. For example, the main ahead tube 310 in conventional ahead stem designs tends to extend only marginally above and/or below the coupling region where the handlebar ahead tube 315 meets the main ahead tube 310.

Some ahead stems have the stem cap 140 integrated therein, while others are clamped below the stem cap 140. One feature of ahead stems is that they are modular and can typically be swapped out for ahead stems in a wide variety of materials (e.g., including new, light-weight materials), colors, sizes, adjustability, etc. For example, with different ahead stems, the handlebar ahead tube 315 can extend from the steerer tube 132 by different amounts (e.g., changing the "reach"), at different angles, with couplers sized to fit different types of handlebars, etc. Another feature of ahead stems is that the centering of the handlebars can be changed without inadvertently changing the height of the stem, which is very difficult to accomplish with a quill stem. Another feature is that it is typically easier to prevent rotational slipping of an ahead stem, without contending with internal seizing and/or other issues often encountered with quill stems.

As described above, and as can be appreciated by comparing FIGS. 2 and 3, there are a number of trade-offs between different stem types. For example, quill stems tend to provide more adjustability; but they also tend to rely on a specially sized, threaded steerer tube 132 and are difficult to keep rotationally secured within the steerer tube 132. In contrast, conventional ahead stems tend to provide more modularity, configuration flexibility, and ease of secure installation; but they often provide very little room for adjustment. This lack of adjustability can be seen in the illustrative conventional ahead stem configuration of FIG. 3. In order to rotationally secure the conventional ahead stem to the steerer tube 132, it is preferable that the steerer tube 132 extends at least minimally beyond both side bolts of the conventional ahead stem. As such, the conventional ahead stem cannot be adjusted upward without either losing rotational security, or getting a longer steerer tube 132. Further, many conventional ahead stems have integrated stem caps 140 that may be flat or angled. As such, adjustment of the conventional ahead stem tends to be limited in the downward direction by the top of the steerer tube 132 running into the stem cap 140.

Figure 4:
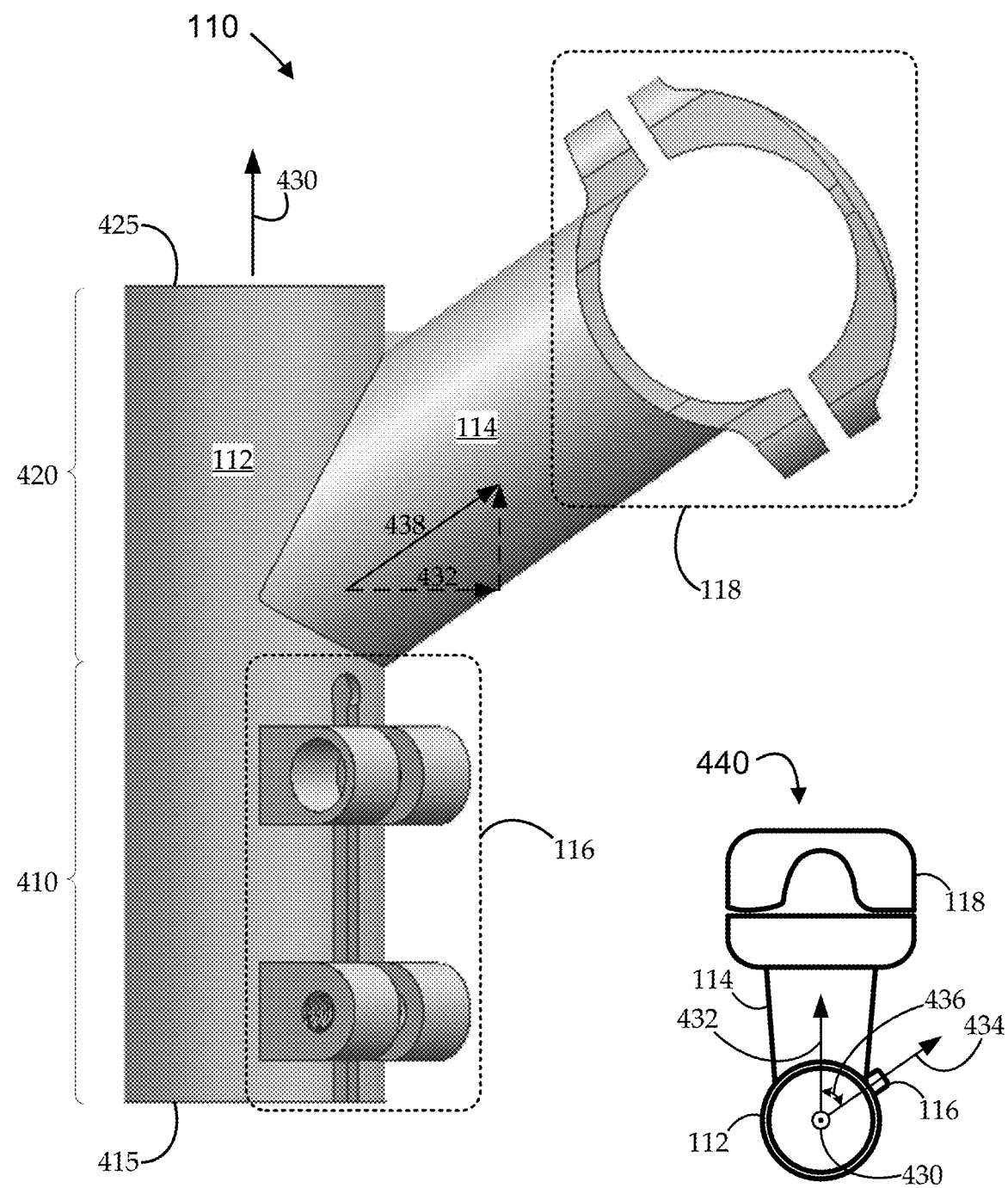
FIG. 4 shows an illustrative novel high-rise stem, according to embodiments described herein.

FIG. 4 shows an illustrative novel high-rise ahead stem 110, according to embodiments described herein. As illustrated, the high-rise ahead stem 110 includes a main stem tube 112 and a handlebar stem tube 114. The main stem tube 112 is configured to sheathe a steerer tube 132 (not shown), and the handlebar stem tube includes a handlebar interface structure 118 to couple with handlebars (not shown). The main stem tube 112 includes a proximal region 410 and a distal region 420. The proximal region 410 extends from proximal end 415 for a portion of the main stem tube 112. For example, the proximal region 410 may be between 25 and 75 percent (e.g., sixty percent) of the total length of the main stem tube 112. The proximal end 415 can be substantially flat, or otherwise configured to couple with a headset assembly 134 (not shown) of a bicycle by using components to hold the proximal end under pressure against the headset assembly 134 directly, or via one or more spacers and/or other components.

The proximal region 410 also includes a rotational securement structure 116 configured to rotationally secure the main stem tube 112 to the steerer tube 132. The main stem tube 112 may be cylindrical, or any other suitable shape for sheathing the steerer tube 132. Embodiments of the main stem tube 112 can be hollow with a substantially constant inner diameter sized relative to the outer diameter of the steerer tube 132. The inner diameter of the main stem tube 112 can be sized, such that the diameter is large enough to slide over the steerer tube 132, but small enough to provide a relatively snug sheathing on the steerer tube 132 (e.g., even when the rotational securement structure 116 is not tightened).

In some embodiments, the rotational securement structure 116 includes a cutout 442 that runs vertically along a length of the proximal region 410 of the main stem tube 112. In some implementations, the length, width, shape, and/or positioning of the cutout 442 are designed toward optimizing the strength of the main stem tube 112, while providing sufficient compressibility so that the main stem tube 112 can be rotationally secured in place around the steerer tube 132. In some such implementations, the cutout 442 can be in a different radial direction from the handlebar stem tube 114, so that forces placed on the handlebars by a rider are not aligned with the cutout 442. For example, upward, downward, rotational, torsional, sheer, and/or other forces on the handlebars during riding can be transferred to the main stem tube 112 via the handlebar stem tube 114. The handlebar stem tube 114 can effectively act as a lever arm between the handlebar interface structure 118 and the main stem tube 112, such that the region in which the handlebar stem tube 114 meets the main stem tube 112 can effectively be a fulcrum point for at least some of the forces, such as upward and downward forces on the handlebars (i.e., such that those forces are effectively multiplied). Embodiments can position the cutout 442 to be out of any primary fulcrum planes.

Embodiments of the rotational securement structure 116 can further include one or more clamping structures 444 to apply compression (e.g., constriction) force around the steerer tube 132 across the cutout 442. In some embodiments, the clamping structures 444 include one or more bolt receiving structures 444 that flank the cutout 442. For example, the illustrated embodiment shows two pairs of bolt receiving structures 444 are integrated into the main stem tube 112. Installing and tightening a respective bolt in each pair of bolt receiving structures compresses the cutout region 442 around the steerer tube 132, thereby rotationally securing the high-rise ahead stem 110 on the steerer tube 132. While two pairs of bolt receiving structures are shown, any suitable number can be used. One implementation uses a single bolt receiving structure (e.g., or a single pair of bolt receiving structures 444). In other implementations, the clamping structures 444 include one or more quick-release (e.g., spring-loaded) clamp structures integrated into the proximal region 410 of the main stem tube 112. As described below, some embodiments of the clamping structures 444 are not integrated with the main stem tube 112. Some such embodiments use one or more ring clamps, quick-release clamps, and/or other clamping structures 444 that are separate from the main stem tube 112. For example, a ring clamp can be slid over proximal region 410 of the main stem tube 112 (e.g., in the area of the cutout 442) prior to sliding the main stem tube 112 onto the steerer tube 132. The ring clamp can then be tightened to apply compression force across the cutout 442. In some such implementations, though the clamping structures 444 themselves are not integrated with the main stem tube 112, the rotational securement structure 116 can include one or more integrated features to support the non-integrated clamping structures 444. For example, the main stem tube 112 can include a reinforced collar region or other features to increase the efficacy and/or reliability of the non-integrated clamping structures 444; and/or the main stem tube 112 can include a slightly indented or raised region, differently colored region, and/or any other features that indicate or assist with desirable placement of the non-integrated clamping structures 444. In some embodiments, the rotational securement structure 116 can include one or more features that are part of a structure other than the main stem tube 112. For example, a strengthening rib can extend from below the handlebar stem tube 114 along the main stem tube 112, and the strengthening rib can incorporate part of the rotational securement structure 116 (e.g., one or more bolt receiving structures.

The distal region 420 extends from the proximal region 410 to a distal end 425 of the main stem tube 112 and defines a high-rise structure. The handlebar stem tube 114 extends from the main stem tube 112 in the high-rise structure (i.e., in the distal region 420). For example, a longer distal region 420 can allow for a greater distance between the top of the rotational securement structure 116 and the bottom of the handlebar stem tube 114. The distal end 425 can be substantially flat and configured to couple with a stem cap and/or one or more spacers. As noted above, embodiments of the main stem tube 112 are hollow, such that the steerer tube 132 can pass through openings in either or both of the proximal end 415 and the distal end 425. For example, in one configuration, the high-rise ahead stem 110 is positioned with the steerer tube 132 inserted only a portion of the way into the main stem tube 112 via the proximal end 415 (e.g., to a position where the top of the main stem tube 112 is above the top of the rotational securement structure 116, but appreciably below the distal end 425). In another configuration, the high-rise ahead stem 110 is positioned with the steerer tube 132 inserted all the way through the main stem tube 112 via the proximal end 415 and past the distal end 425 (e.g., to a position where the top of the main stem tube 112 is above the distal end 425). In another configuration, the high-rise ahead stem 110 is installed upside-down, with the steerer tube 132 inserted fully into the main stem tube 112 via the distal end 425 (e.g., to a position where the top of the main stem tube 112 is at least mostly beyond the rotational securement structure 116).

Certain features can be more clearly seen in the illustrated top view 440 of the high-rise ahead stem 110. The main stem tube 112 can be considered as defining an axis 430. For example, the main stem tube 112 can effectively be shaped as a substantially constant cross-section (e.g., a circle or oval), extruded along the axis 430 to form a cylinder, or other three-dimensional pipe. In the top view 440, the axis 430 is pointing out of the page. In such a context, the handlebar stem tube 114 extends from the main stem tube 112 in a direction having at least a directional component that is orthogonal to the axis 430, defining a first direction 432. For example, the handlebar stem tube 114 is shown in the side view as extending from the main stem tube 112 primarily along a vector 438 having a component first direction 432 that is orthogonal to the axis 430. The cutout 442, clamping structures 444, and/or other structures (e.g., the protruding bolt receiving structures) of the rotational securement structure 116 can be positioned on the main stem tube 112 in a location that is rotated away from the first direction 432 by some angle 436 to point in a second direction 434.

For example, the axis 430 can define a z-axis, and first direction 432 can define an x-axis, both a standard three-dimensional coordinate system having orthogonal x-, y-, and z-axes. In such a context, the vector 438 can be seen as lying in the plane intersecting the x-axis and z-axis. The illustrated configuration shows the handlebar stem tube 114 extending primarily along a path that increases in z as a function of an increase in x (i.e., the handlebar stem tube 114 rises as it extends away from the main stem tube 112). For example, the handlebar stem tube 114 may extend in a direction of approximately 6 degrees of rise, 17 degrees of rise, or any other desired amount. In other embodiments, the vector can be substantially parallel with the x-axis (i.e., the handlebar stem tube 114 extends substantially horizontally away from the main stem tube 112). In other embodiments, the vector can decrease in z as a function of an increase in x (i.e., the handlebar stem tube 114 descends as it extends away from the main stem tube 112). The path of the handlebar stem tube 114 can be straight, curved, or any suitable path.

Conventional ahead stems tend to have rotational securement structures pointing in the direction of the rider. One reason is that the rotational securement structure and the handlebar stem tube tend to occupy the same vertical space on the main stem tube in conventional configurations. For example, it can be seen in FIG. 3 that the rotational securement structures 116 are directly across from the location at which the handlebar ahead tube 315 connects with the main ahead tube 310. In contrast, in some embodiments of the novel high-rise ahead stem 110, the rotational securement structure 116 is pointing away from the rider. The rotational securement structure 116 may further be rotated away from the handlebar stem tube 114.

As shown in the top view 440, components of the rotational securement structure 116 can primarily point in a second direction 434 that lies in an x-y plane and points in a direction rotated away from the first direction 432 by angle 436. For example, the second direction 434 can be defined by a centerline of the cutout, or by any other suitable reference location. In some embodiments, the angle 436 can be any angle between −90 and 90 degrees. In other embodiments, the angle can be any angle between −45 and 45 degrees. The angle 436 can be selected to provide a balance between various features. For example, the rotational securement structure 116 may be rotated away from the rider enough to help avoid the rider's knees or other features bumping the stem even while turning. As another example, the rotational securement structure 116 is not rotated so far as to interfere with the bottom of the handlebar stem tube 114, where there is limited clearance. However, in some implementations, the main stem tube 112 is long enough that the handlebar stem tube 114 can intersect with the main stem tube 112 well above the top of the rotational securement structure 116, such that such interference is not a concern. In some embodiments, the rotational securement structure 116 is positioned to avoid high stress regions of the main stem tube 112. For example, large dynamic forces can tend to travel from the front wheel up to the handlebars, passing through the high-rise ahead stem 110, and those forces can tend to be greater in certain locations, such as directly in line with and opposite the first direction 432 (i.e., the direction in which the handlebar stem tube 114 extends away from the main stem tube 112). As such, some implementations position the rotational securement structure 116 (e.g., including the cutout) to face away from the rider, but output line with the second direction 432. The illustrated implementation is an example of such a positioning.

In addition to the rotational positioning of elements of the high-rise ahead stem 110, embodiments include vertical positioning to support certain features. In some embodiments, the main stem tube 112 is configured (e.g., sized) to provide vertical distance between the rotational securement structure 116 and the handlebar stem tube 114. In some embodiments, the main stem tube 112 is at least 60 millimeters (mm) long. For example, the proximal region 410 (including the rotational securement structure 116) may be approximately 40-50 mm long, and the distal region 420 extends at least 10-20 mm above the top of the rotational securement structure 116. In some embodiments, the main stem tube 112 is at least 100 mm long. For example, the proximal region 410 (including the rotational securement structure 116) may consume more than 50 percent of the total length of the main stem tube 112, and the distal region 420 may consume less than 50 percent or more of the total length of the main stem tube 112. In some embodiments, the distal region 420 (including the high-rise structure) is at least 30 mm long.

Figure 5B:
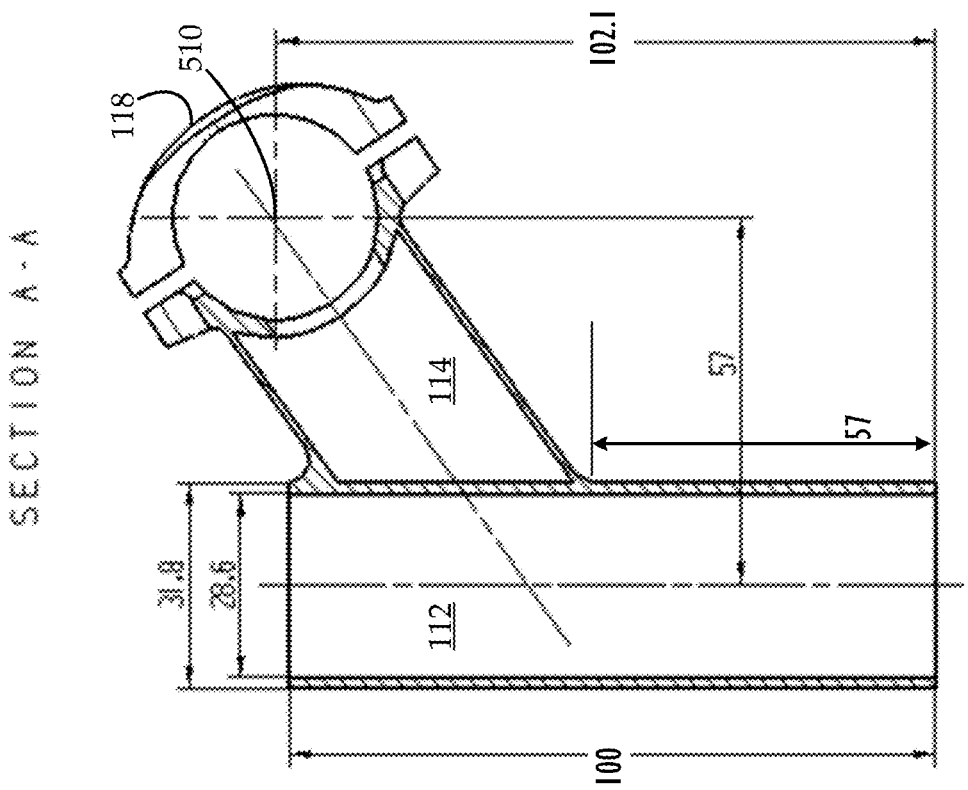
FIGS. 5A and 5B show an illustrative set of dimensions for an implementation of the high-rise ahead stem.
Figure 5A:
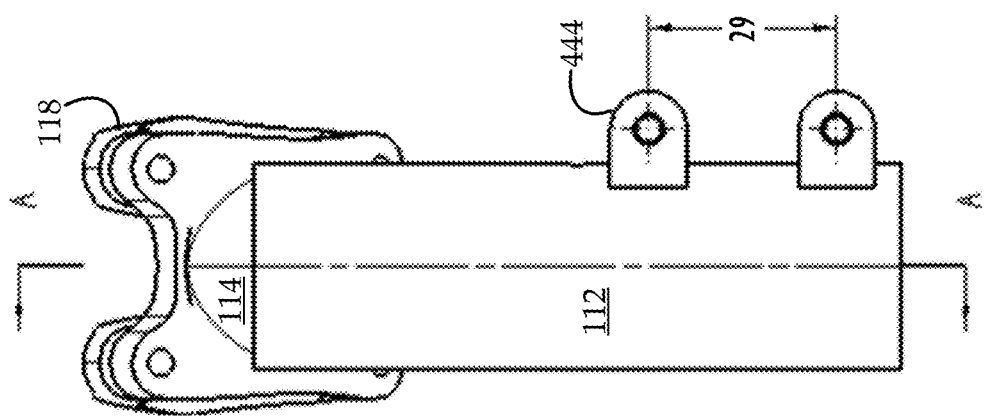

FIGS. 5A and 5B show an illustrative set of dimensions for an implementation of the high-rise ahead stem 110. As indicated, FIG. 5B is a section cut view of 5A. The main stem tube 112 is approximately 100 mm long (from the proximal end 415 to the distal end 425), with the bottom of the handlebar stem tube 114 intersecting with the main stem tube 112 approximately 57 mm from the proximal end 415. The main stem tube 112 has an outer diameter of 31.8 mm and an inner diameter of slightly larger than 28.6 mm. Such a diameter can, for example, be configured to fit over a standard steerer tube 132 diameter of approximately 28.6 mm. Larger diameters of main stem tubes 112 can be used to fit other standard steerer tube 132 diameters, such as 38.1 mm, or 39.68 mm; or larger inner-diameter main stem tubes 112 can be used with shims, or other components, to work with smaller diameter steerer tubes 132.

The illustrated embodiment of the high-rise ahead stem 110 raises a handle center 510 of the handlebar interface structure 118 approximately 102.1 mm from the proximal end 415. Changes in the angle and/or length of the handlebar stem tube 114, the length of the proximal region 410 of the main stem tube 112, and or other dimensions can raise the center of the handlebar interface structure 118 by a different amount. The illustrated embodiment of the high-rise ahead stem 110 also shows an illustrative implementation of clamping structures 444 of the rotational securement structure 116. As illustrated, two pairs of bolt receiving structures are used for the clamping structures 444; the pairs are both located within the proximal region 410 of the main stem tube 112 and are vertically spaced apart by approximately 29 mm.

Figure 6:
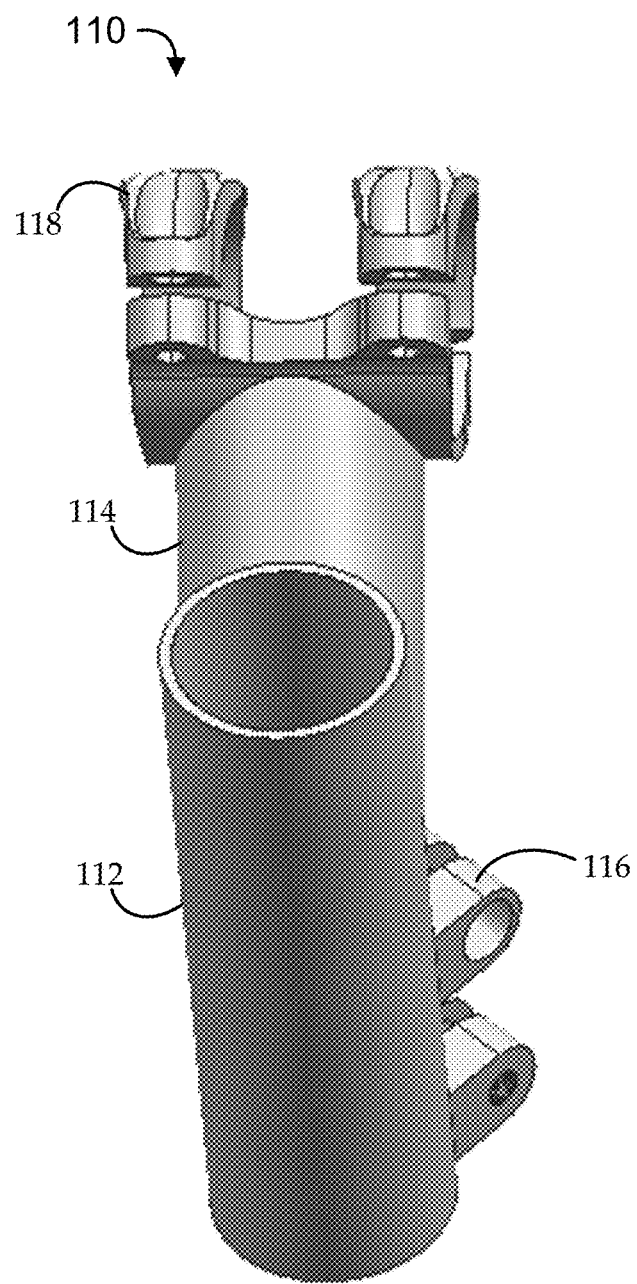
FIG. 6 shows a perspective view of an illustrative high-rise ahead stem, according to various embodiments described herein.

For added clarity, FIG. 6 shows a perspective view of an illustrative high-rise ahead stem 110, according to various embodiments described herein. The illustrated high-rise ahead stem 110 includes illustrative implementations of a main stem tube 112, a handlebar stem tube 114, a rotational securement structure 116, and a handlebar interface structure 118. As shown, the main stem tube 112 is hollow and sized to slide onto a steerer tube 132. For example, the inner diameter of the main stem tube 112 is substantially the same as (e.g., slightly larger than) the diameter of a compatible steerer tube 132.

Figure 7C:
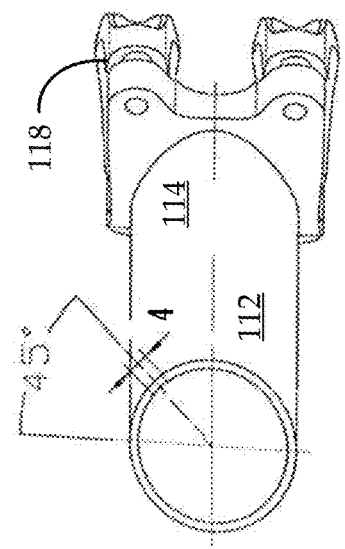
FIGS. 7A-7C show an illustrative set of drawings and dimensions for another implementation of the high-rise ahead stem.
Figure 7B:
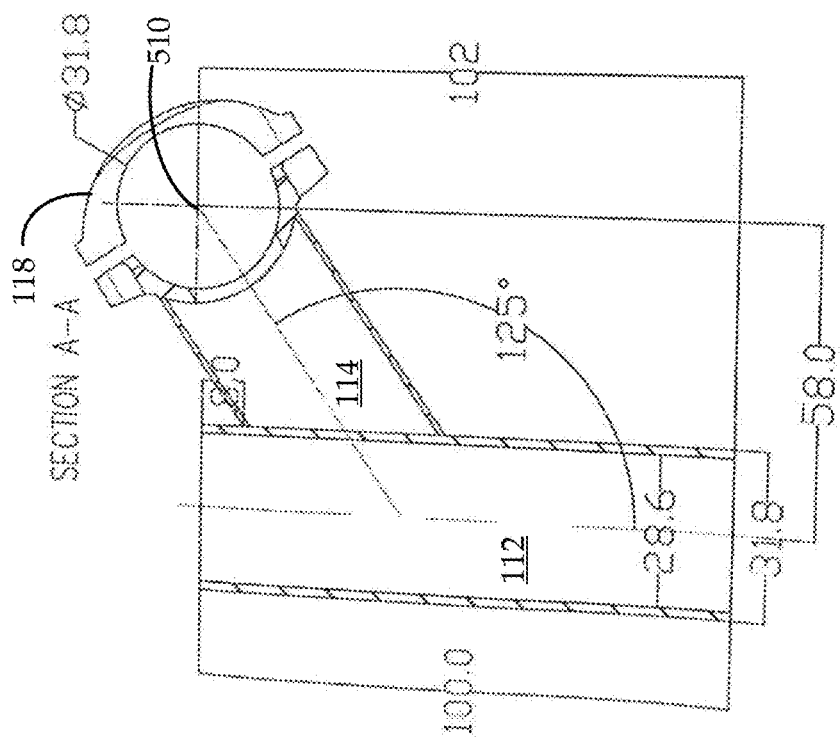
Figure 7A:
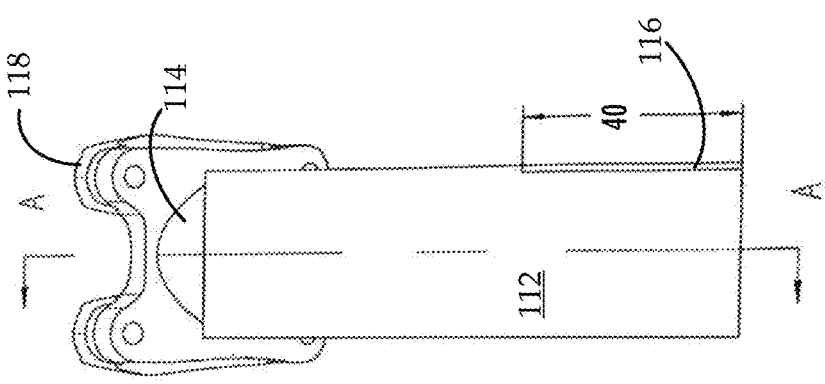

FIGS. 7A-7C show an illustrative set of drawings and dimensions for another implementation of the high-rise ahead stem 110. FIG. 7A is a front view, FIG. 7B is a section cut view of a section indicated in FIG. 7A, and FIG. 7C is a bottom view. Similar to FIGS. 5A and 5B, the main stem tube 112 is shows as approximately 100 mm long, the bottom of the handlebar stem tube 114 can intersect with the main stem tube 112 approximately 57 mm from the proximal end 415, and the main stem tube 112 has an outer diameter of 31.8 mm and an inner diameter of slightly larger than 28.6 mm. The main stem tube 112 can have any suitable inner diameter to facilitate interfacing with different diameters of steerer tubes 132. In some cases, the main stem tube 112 has an outer diameter selected to support clamp-on components, or for other reasons. The high-rise ahead stem 110 is designed so that the handle center 510 of the handlebar interface structure 118 approximately 102 mm above the proximal end 415 and approximately 58 mm in front of the central axis of the main stem tube 112. The handlebar stem tube 114 is shown extending from the main stem tube 112 with a rise angle of approximately 125 degrees.

Unlike in FIGS. 5A and 5B, the rotational securement structure 116 of the illustrated embodiment of the high-rise ahead stem 110 in FIGS. 7A-7C includes a cutout 442 without integrated clamping structures 444 (i.e., the embodiment is intended to be used with one or more non-integrated clamping structures 444). As illustrated, the cutout 442 is fully located within the proximal region 410 of the main stem tube 112 and has dimensions of approximately 4 mm wide by 40 mm high. It can be seen in FIG. 7C that a center line of the cutout 442 is rotated approximated 45 degrees (around the primary axis 430 of the main stem tube 112) from the direction in which the handlebar stem tube 114 extends from the main stem tube 112.

Figure 8:
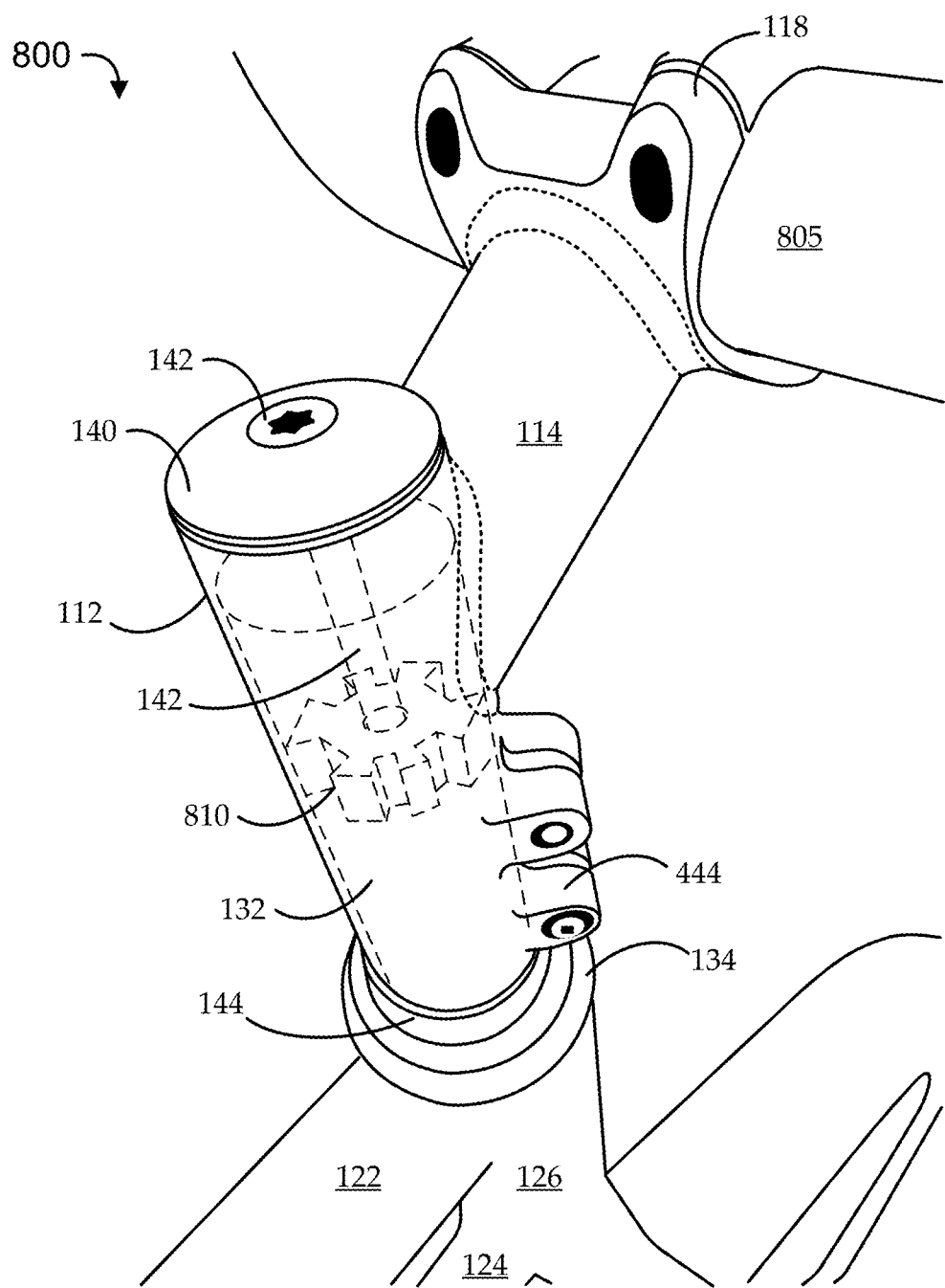
FIG. 8 shows a first illustrative installation of an embodiment of the high-rise ahead stem.

FIG. 8 shows a first illustrative installation 800 of an embodiment of the high-rise ahead stem 110. The illustrated geometries are all simplified to avoid overcomplicating the figure. The high-rise ahead stem 110 is shown installed on a bicycle, with the frame top tube 122, frame bottom tube 124, frame head tube 126, and handlebars 805 shown for context. A portion of the steerer tube 132 is shown with an illustrative star nut 810 installed therein. The illustrative installation 800 can be considered as a "neutral" installation. The installation 800 uses either no spacers 144, or a small number of spacers 144 (e.g., one or two) between the high-rise ahead stem 110 and the top of the headset assembly 134. As such, the steerer tube 132 is inserted most (or substantially all) of the way into the hollow interior of the high-rise ahead stem 110, and a stem cap 140 is installed on top (i.e., at the distal end 425 of the main stem tube 112 of the high-rise ahead stem 110).

The high-rise ahead stem 110 is rotationally secured to the steerer tube 132 by the rotational securement structure 116, which is shown in the illustrated installation 800 as an integrated cutout 442 and an integrated clamping structure 444 (bolt receiving structures). A cap bolt 142 is shown screwed through the stem cap 140 and into the star nut 810, thereby loading the headset assembly 134 across the stack of components (i.e., the stem cap 140, the high-rise ahead stem 110, and any spacers 144).

Figure 9:
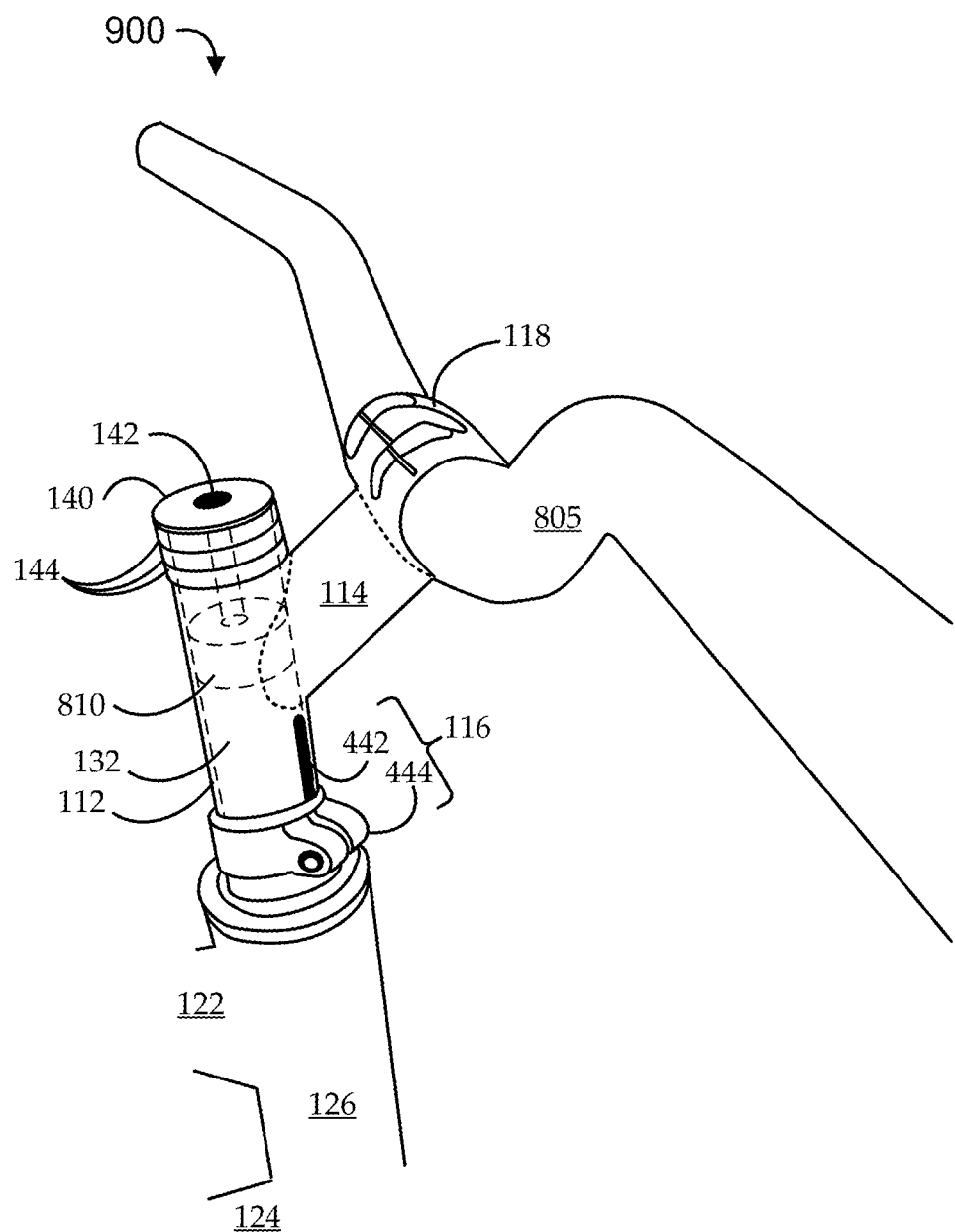
FIG. 9 shows a second illustrative installation of an embodiment of the high-rise ahead stem.

FIG. 9 shows a second illustrative installation 900 of an embodiment of the high-rise ahead stem 110. The illustrated geometries are all simplified to avoid overcomplicating the figure. The high-rise ahead stem 110 is shown installed on a bicycle, with the frame top tube 122, frame bottom tube 124, frame head tube 126, and handlebars 805 shown for context. A portion of the steerer tube 132 is shown with an illustrative star nut 810 installed therein. The illustrative installation 900 can be considered as a "lowered" installation. The installation 900 uses multiple spacers 144 between the distal end 425 of the high-rise ahead stem 110 and the stem cap 140. As such, the steerer tube 132 is inserted beyond the distal end 420 of the high-rise ahead stem 110 (i.e., all the way through the hollow interior of the high-rise ahead stem 110), and a stem cap 140 is installed on top of the stack of spacers 144. The high-rise ahead stem 110 is rotationally secured to the steerer tube 132 by the rotational securement structure 116, which is shown in the illustrated installation 900 as an integrated cutout 442 and a non-integrated clamping structure 444. A cap bolt 142 is shown screwed through the stem cap 140 and the stack of spacers 144 and into the star nut 810, thereby loading the headset assembly 134 across the stack of components (i.e., the stem cap 140, the stack of spacers 144, and high-rise ahead stem 110).

Figure 10:
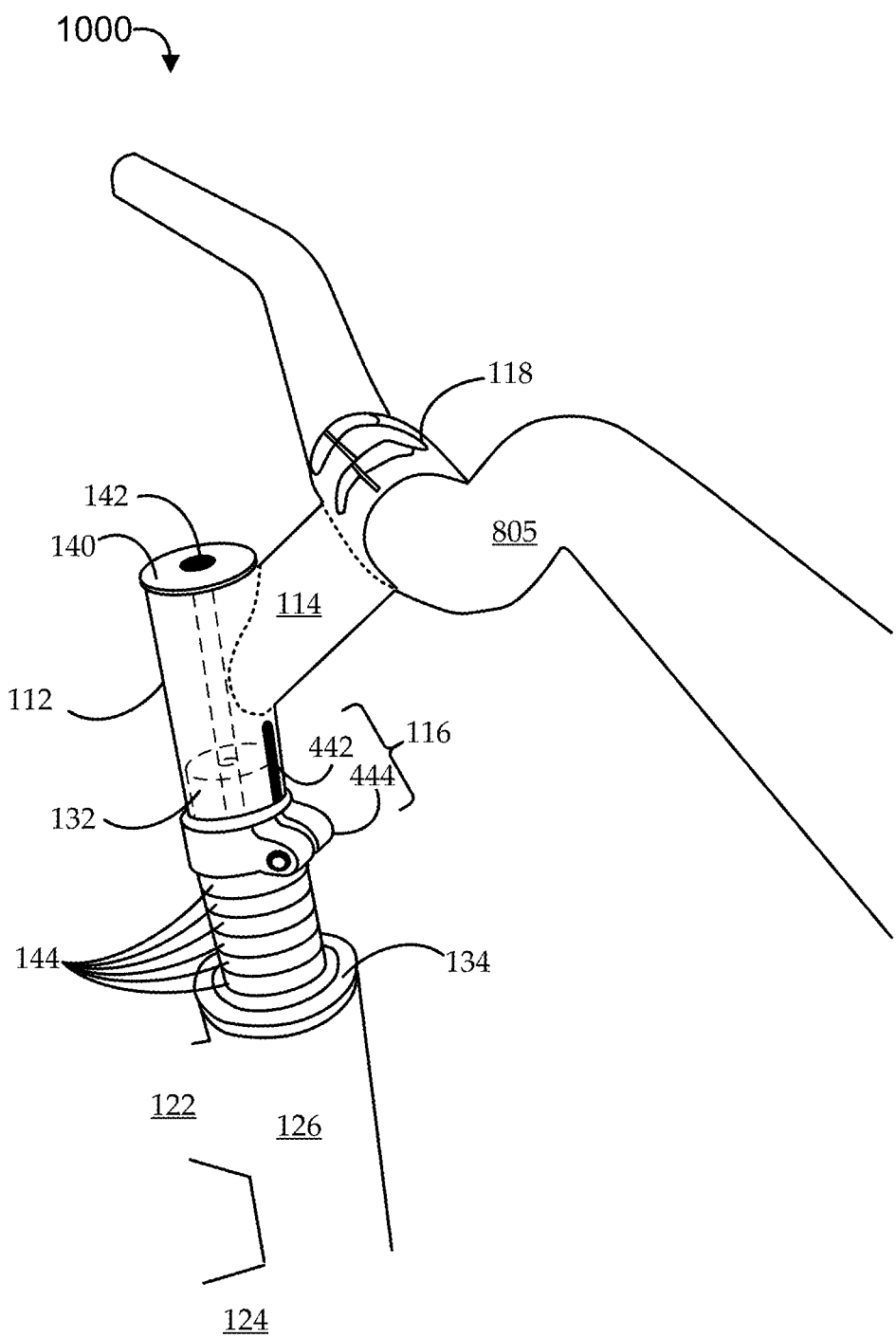
FIG. 10 shows a third illustrative installation of an embodiment of the high-rise ahead stem.

FIG. 10 shows a third illustrative installation 1000 of an embodiment of the high-rise ahead stem 110. The illustrated geometries are all simplified to avoid overcomplicating the figure. The high-rise ahead stem 110 is shown installed on a bicycle, with the frame top tube 122, frame bottom tube 124, frame head tube 126, and handlebars 805 shown for context. A portion of the steerer tube 132 is shown with an illustrative star nut 810 installed therein. The illustrative installation 1000 can be considered as a "raised" installation. The installation 1000 uses multiple spacers 144 between the proximal end 415 of the high-rise ahead stem 110 and the top of the headset assembly 134. As such, the steerer tube 132 is inserted only partially into the high-rise ahead stem 110, but still far enough into the main stem tube 112 to be secured in place at the rotational securement structure 116 (shown as an integrated cutout 442 and a non-integrated clamping structure 444). A cap bolt 142 is shown screwed through the stem cap 140 and into the star nut 810, thereby loading the headset assembly 134 across the stack of components (i.e., the stem cap 140, the high-rise ahead stem 110, and the stack of spacers 144).

Figure 11:
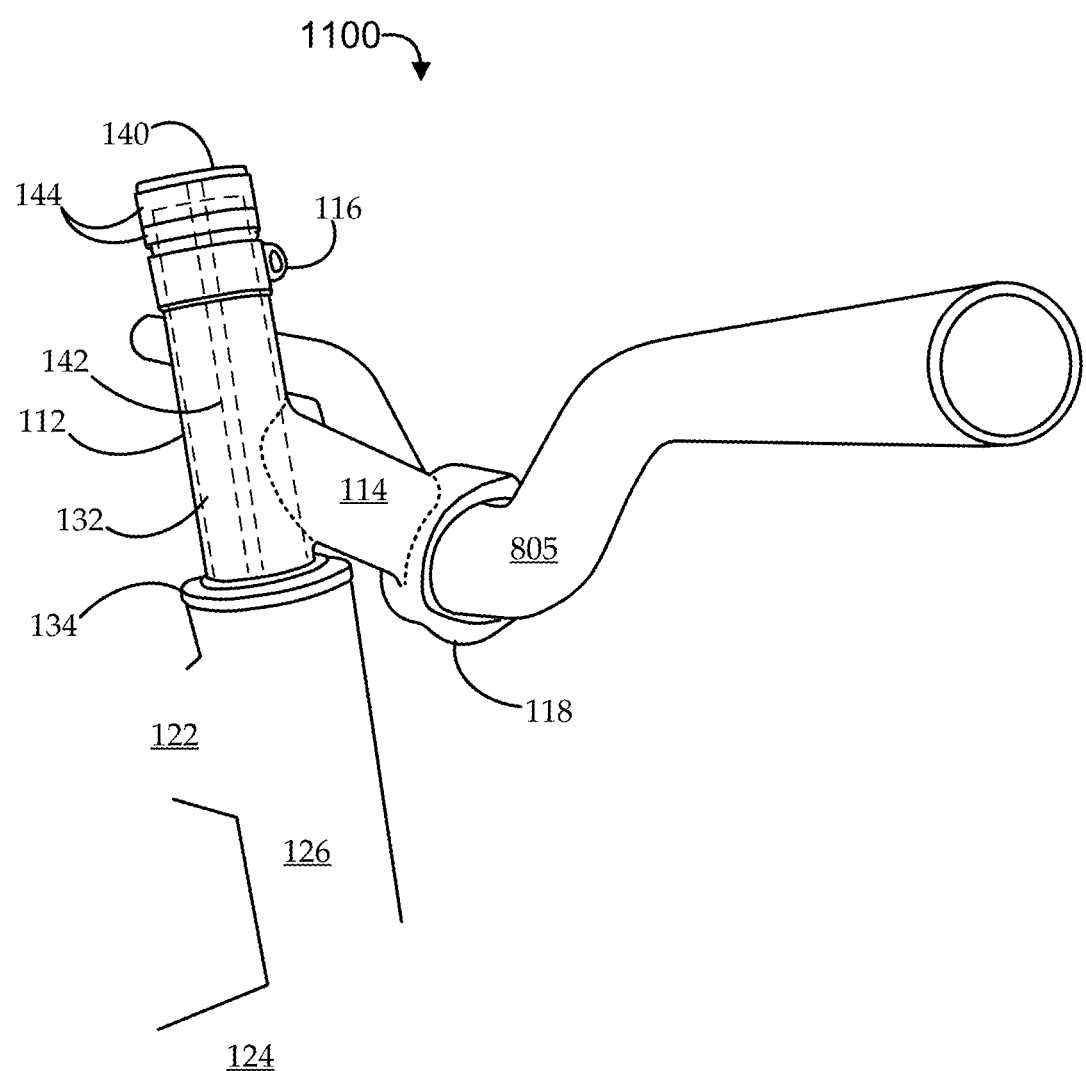
FIG. 11 shows a fourth illustrative installation of an embodiment of the high-rise ahead stem.

FIG. 11 shows a fourth illustrative installation 1100 of an embodiment of the high-rise ahead stem 110. The illustrated geometries are all simplified to avoid overcomplicating the figure. The high-rise ahead stem 110 is shown installed on a bicycle, with the frame top tube 122, frame bottom tube 124, frame head tube 126, and handlebars 805 shown for context. A portion of the steerer tube 132 is shown with an illustrative star nut 810 installed therein. The illustrative installation 1100 can be considered as an "inverted" installation. The installation 1100 inverts the high-rise ahead stem 110 such that the distal end 425 is toward the headset assembly 134. One or more spacers 144 can be used at the top and/or bottom of the assembly stack (i.e., above and/or below the high-rise ahead stem 110). In the illustrated assembly 1100, a couple of spacers 144 are stacked between the stem cap 140 and the proximal end 415 of the high-rise ahead stem 110. Similar to the installation 900 of FIG. 9, the steerer tube 132 is inserted beyond the distal end 425 of the high-rise ahead stem 110 (i.e., all the way through the hollow interior of the high-rise ahead stem 110), and a stem cap 140 is installed on top of the stack of spacers 144. The high-rise ahead stem 110 is rotationally secured to the steerer tube 132 by the rotational securement structure 116, which is shown in the illustrated installation 1100 as an integrated cutout 442 and a non-integrated clamping structure 444. A cap bolt 142 is shown screwed through the stem cap 140 and the stack of spacers 144 and into the star nut 810, thereby loading the headset assembly 134 across the stack of components (i.e., the stem cap 140, the stack of spacers 144, and high-rise ahead stem 110). Notably, with the high-rise ahead stem 110 inverted, the handlebar stem tube 114 is angled downward.

It can be seen that the design of the high-rise ahead stem 110 can support a wide range of handlebar heights, while maintaining a very strong coupling between the handlebars and the steerer tube 132. For the sake of illustration, suppose the steerer tube 132 is cut to extend approximately 120 mm above the top of the headset assembly 134, and the high-rise ahead stem 110 is manufactured according to the approximate dimensions of FIGS. 5A and 5B, or 7A-7C. Further for the sake of illustration, suppose that the high-rise ahead stem 110 can be rotationally secured by the rotational securement structure 116 when the steerer tube 132 is inserted at least 40 mm into the main stem tube 112. In the illustrated installation 1000 of FIG. 10, using such suppositions, the center of the handlebar interface structure 118 may be raised to approximately 62 mm above the top of the steerer tube 132, which is approximately 182 mm above the top of the headset assembly 134. In the illustrated installation 1100 of FIG. 11, under the same suppositions, the center of the handlebar interface structure 118 may be lowered to approximately 2 mm below the distal end 425 of the main stem tube 112, which is approximately 2 mm the top of the headset assembly 134. The difference between the two installations shows that the high-rise ahead stem 110 provides a very large amount (i.e., approximately 184 mm, or more than seven inches, under the above suppositions) of adjustability in handlebar height, with substantially the same amount of strength, weight, etc. Even relatively small changes in handlebar height can be significant to many riders. For example, different heights of the handlebar interface structure 118 may yield a different effective handlebar height for different types of handlebars. As another example, even small changes in height can produce enough change in rider position as to provide noticeable changes in comfort, fatigue, muscle usage, etc., particularly over long-distance rides, rides with complex terrain, or the like. A rider can even choose to change the configuration during a ride, such as switching from a normal or raised installation to a lowered or inverted configuration as the rider fatigues, encounters different terrains, etc.

Figure 12:
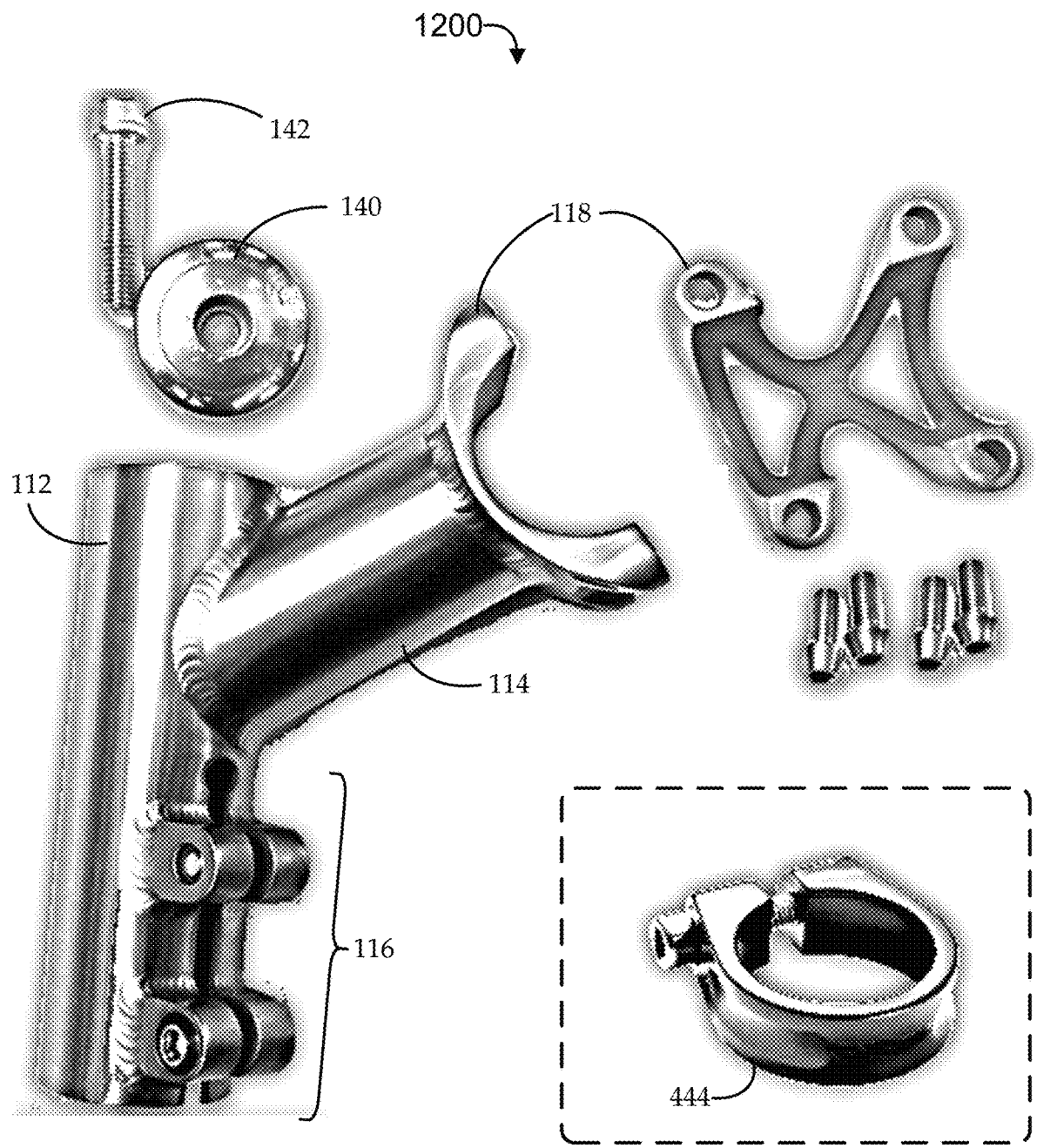
FIG. 12 shows an illustrative kit for installation of embodiments of the high-rise ahead stem.

FIG. 12 shows an illustrative kit 1200 for installation of embodiments of the high-rise ahead stem 110. In some implementations, the high-rise ahead stem 110 is sold as a kit of parts having at least the high-rise ahead stem 110, including the main stem tube 112 with integrated portions of the rotational securement structure 116 (e.g., cutout 142), and the handlebar stem tube 114 with the handlebar interface structure 118. Some embodiments of the handlebar interface structure 118 include multiple pieces, between which the handlebars can be sandwiched, and the multiple pieces are secured and tightened together using attachment hardware (e.g., screws, bolts, nuts, etc.). In such embodiments, the kit 1200 can include the one or more non-integrated pieces of the handlebar interface structure 118, as well as any non-integrated attachment hardware. Some embodiments of the rotational securement structure 116 include integrated clamping structures 444 (e.g., bolt receiving structures, as illustrated) that are secured, tightened, or otherwise implemented using additional non-integrated pieces, such as attachment hardware; and embodiments of the kit 1200 can include such non-integrated attachment hardware for the rotational securement structure 116. While the high-rise ahead stem 110 in the kit 1200 is illustrated in FIG. 12 as having integrated clamping structures 444, other embodiments of the kit 1200 include those embodiments of the high-rise ahead stem 110 configured for non-integrated clamping structures 444. Some such embodiments of the kit 1200 can include one or more non-integrated clamping structures 444, such as one or more post clamps, C-clamps, quick-release clamps, etc., and/or any associated attachment hardware for the rotational securement structure 116. Some embodiments of the kit 1200 also include one or more stem caps 140. Some embodiments of the kit 1200 also include one or more cap bolts 142 (e.g., of one or more different lengths). For example, some embodiments include a cap bolt 142 of 50-80 mm in length to support various installation configurations. Some embodiments of the kit 1200 also include one or more star nuts and/or other hardware for axially securing the high-rise ahead stem 110 to the steerer tube 132 cap bolts 142 (e.g., of one or more different lengths). Some embodiments of the kit 1200 further include packaging and/or instructions (not shown). Some embodiments of the kit 1200 also include one or more spacers 144 (not shown). The spacers 144 can be any suitable width, such as 3 mm, 6 mm, 8 mm, 12 mm, and/or 25 mm. Some such embodiments include multiple spacers 144 of different widths. Some embodiments of the kit 1200 can include additional bicycle components, such as the steerer tube 132, one or more parts of a frame, handlebars, etc.

Figure 13:
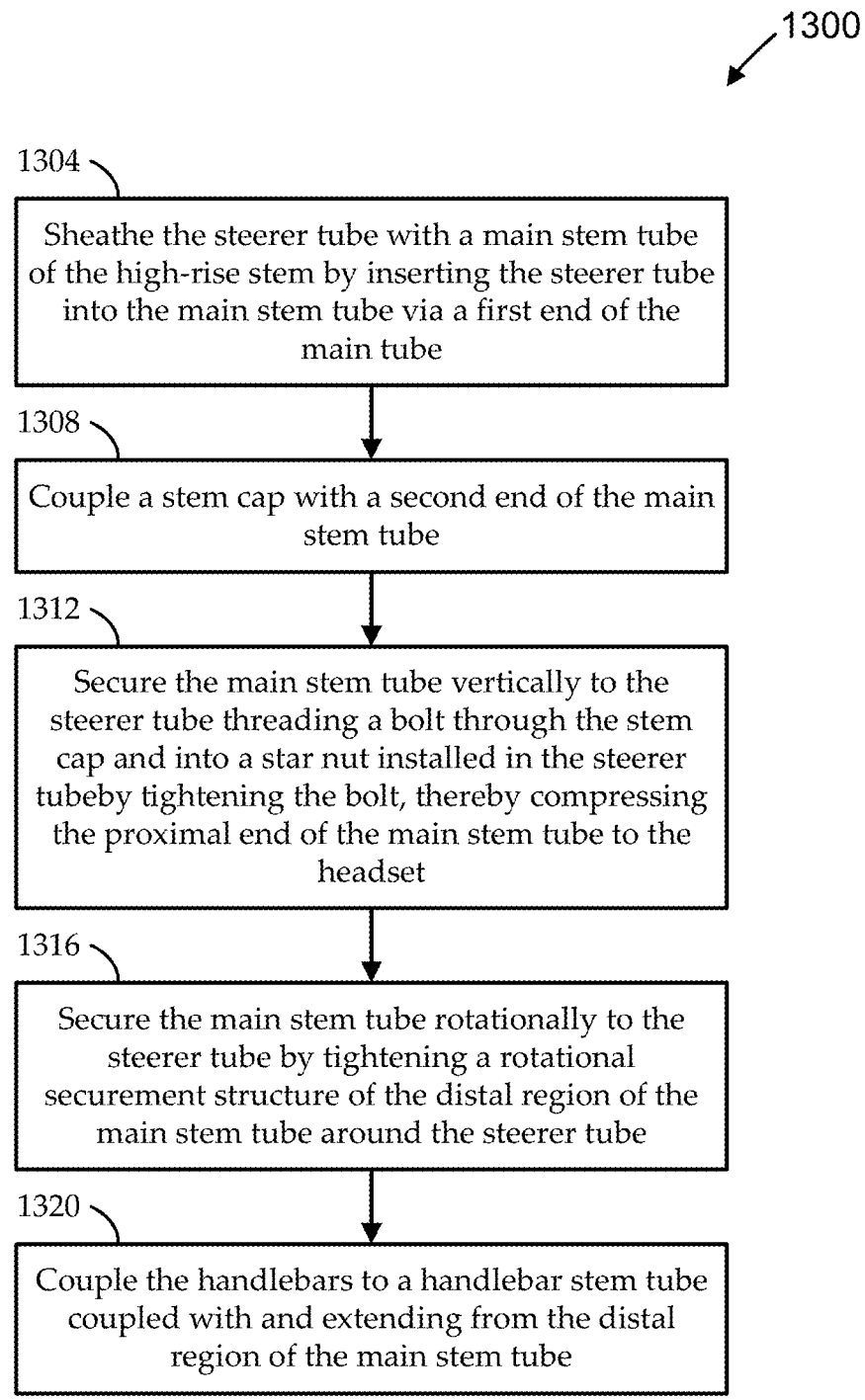
FIG. 13 shows a flow diagram of an illustrative method for installing a high-rise ahead stem on a bicycle, according to various embodiments.

FIG. 13 shows a flow diagram of an illustrative method 1300 for installing a high-rise ahead stem on a bicycle, according to various embodiments. The bicycle is assumed to have a front steering assembly including a steerer tube, a headset, and handlebars. The high-rise ahead stem has a proximal region and a distal region. Embodiments of the method 1300 begin at stage 1304 by sheathing the steerer tube with a main stem tube of the high-rise ahead stem by inserting the steerer tube into the main stem tube via an opening of the main tube. In one implementation, the steerer tube is inserted into the main stem tube via an opening of the main tube at a proximal end of the proximal region for an upright configuration. In another implementation, the steerer tube is inserted into the main stem tube via an opening of the main tube at a distal end of the distal region for an inverted configuration.

At stage 1308, embodiments can couple a stem cap to an end (e.g., the distal end of the distal region in the upright configuration, or the proximal end of the proximal region in the inverted configuration) of the main stem tube by threading a bolt through the stem cap and into a star nut installed in the steerer tube. In some embodiments, coupling the stem cap at stage 1308 includes stacking one or more spacers between the top of the main stem tube (e.g., the distal end, in the upright configuration) and the stem cap, and threading the bolt into the star nut through the stem cap and the spacers. In some embodiments, coupling the stem cap at stage 1308 includes stacking one or more spacers between the bottom of the main stem tube (e.g., the proximal end, in the upright configuration) and the headset, and threading the bolt into the star nut through the stem cap and the spacers, such that tightening the bolt compresses the main stem tube to the headset via the spacers. In some embodiments, coupling the stem cap at stage 1308 includes stacking one or more spacers between the bottom of the main stem tube and the headset and between the top of the main stem tube and the stem cap, and threading the bolt into the star nut through the stem cap and the spacers, such that tightening the bolt compresses the main stem tube to the headset via the spacers.

At stage 1312, embodiments can secure the main stem tube vertically (axially) to the steerer tube by tightening the bolt, thereby compressing the main stem tube to the headset and loading the headset. At stage 1316, embodiments can secure the main stem tube rotationally to the steerer tube by tightening a rotational securement structure of the proximal region of the main stem tube around the steerer tube. As described herein, some embodiments of the rotational securement structure are fully integrated with the main stem tube, and other embodiments of the rotational securement structure are at least partially non-integrated with the main stem tube. In some embodiments, the securing at stage 1316 includes sliding one or more non-integrated clamping structures onto the main stem tube prior to sliding the main stem tube onto the steerer tube. At stage 1320, embodiments can couple the handlebars to a handlebar stem tube coupled with and extending from the distal region of the main stem tube.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A high-rise ahead stem comprising:
a main stem tube configured to sheathe a steerer tube such that a front half of the main stem tube faces away from a rider, the main stem tube comprising:
a proximal region extending axially from a proximal end of the main stem tube to a region boundary, the proximal end configured to be compressed against a headset assembly of a bicycle in an upright installation;
a distal region extending axially from the region boundary to a distal end of the main stem tube; and
a cutout that begins at the proximal end, extends axially along the proximal region in the front half of the main stem tube, and terminates within the proximal region without crossing the region boundary;
a rotational securement structure to rotationally secure the main stem tube to the steerer tube at least by applying clamping pressure across the cutout; and
a handlebar stem tube extending from a first end at the front half of the main stem tube in the distal region to a second end comprising a handlebar interface structure to secure a handlebar to the handlebar stem tube.

2. The high-rise ahead stem of claim 1, wherein the distal end is a substantially flat distal end configured to interface with a stem cap in the upright installation.

3. The high-rise ahead stem of claim 2, wherein the proximal end is configured to be compressed against the headset assembly of the bicycle in the upright installation by threading a cap bolt via the stem cap and into a nut installed in the steerer tube, and tightening the cap bolt in the nut to compress the main stem tube between the stem cap and the headset assembly.

4. The high-rise ahead stem of claim 1, wherein:
the proximal end is further configured to interface with a stem cap in an inverted installation; and
the distal end is a substantially flat distal end configured to be compressed against the headset assembly of the bicycle in the inverted installation.

5. The high-rise ahead stem of claim 1, wherein the main stem tube is a fully hollow tube of substantially constant inner diameter.

6. The high-rise ahead stem of claim 1, wherein the main stem tube is at least 100 millimeters long.

7. The high-rise ahead stem of claim 1, wherein the proximal region is at least half as long as the main stem tube.

8. The high-rise ahead stem of claim 1, wherein the main stem tube is at least 60 millimeters long.

9. The high-rise ahead stem of claim 1, wherein the rotational securement structure further comprises a clamping structure configured to apply the clamping pressure across the cutout to form a compression collar around the steerer tube.

10. The high-rise ahead stem of claim 9, wherein at least a portion of the clamping structure is integrated with the main stem tube.

11. The high-rise ahead stem of claim 1, wherein:
a centerline running axially through the main stem tube defines a first axis;
a second axis is orthogonal to the first axis and intersects with the first axis and with a center of the handlebar interface structure;
a third axis is orthogonal to the first axis and intersects with the first axis and with a center of the cutout; and
the second axis and the third axis form an angle between −90 and 90 degrees.

12. The high-rise ahead stem of claim 11, wherein the angle is between −45 and 45 degrees.

13. The high-rise ahead stem of claim 1, wherein the main stem tube and the handlebar stem tube are formed as a unitary structure.

14. A kit for installing a high-rise ahead stem, the kit comprising:
the high-rise ahead stem of claim 1;
installation instructions; and
a cap bolt and/or a non-integrated clamping structure.

15. A method for installing a high-rise ahead stem on a bicycle, the bicycle having a front steering assembly comprising a steerer tube, a headset assembly, and handlebars, the method comprising:
sheathing the steerer tube with a main stem tube of the high-rise ahead stem by inserting the steerer tube into the main stem tube via a first end of the main stem tube, such that a front half of the main stem tube faces away from a rider of the bicycle;
coupling a stem cap with a second end of the main stem tube opposite the first end of the main stem tube;
securing the main stem tube axially to the steerer tube by threading a cap bolt via the stem cap into a nut installed in the steerer tube and tightening the cap bolt, thereby compressing the first end of the main stem tube to the headset assembly via at least the stem cap and the high-rise ahead stem;
securing the main stem tube rotationally to the steerer tube by tightening a rotational securement structure around the steerer tube to apply clamping pressure across a cutout fully disposed within a proximal region of the main stem tube; and
coupling the handlebars to a handlebar stem tube coupled with and extending from an intersection location fully disposed within a distal region of the main stem tube that is axially non-overlapping with the proximal region,
both the intersection location and the cutout being in the front half of the stem tube.

16. The method of claim 15, wherein the first end of the main stem tube is a proximal end of the main stem tube, and the second end of the main stem tube is a distal end of the main stem tube.

17. The method of claim 15, wherein the first end of the main stem tube is a distal end of the main stem tube, and the second end of the main stem tube is a proximal end of the main stem tube.

18. The method of claim 15, further comprising:
stacking one or more spacers between the second end and the stem cap, and/or between the first end and the headset assembly,
wherein the tightening the cap bolt compresses the first end of the main stem tube to the headset assembly via the stem cap, the one or more spacers, and the high-rise ahead stem.

19. The method of claim 15, further comprising:
installing a non-integrated clamping structure onto the proximal region of the main stem tube to complete the rotational securement structure prior to sheathing the steerer tube with the main stem tube.

* * * * *